United States Patent [19]

Brown

[11] Patent Number: 4,511,005

[45] Date of Patent: Apr. 16, 1985

[54] CENTERLINE SIGHT WITH REVERSE PENDULUM

[75] Inventor: Sam J. Brown, Cozad, Nebr.

[73] Assignee: Sam J. Brown Land & Cattle Company, Inc., Cozad, Nebr.

[21] Appl. No.: 548,993

[22] Filed: Nov. 7, 1983

[51] Int. Cl.³ .............................................. A01B 69/00
[52] U.S. Cl. ................................ 172/430; 33/185 V; 33/264; 33/401
[58] Field of Search ............. 172/430; 33/185 V, 264, 33/286, 295, 391, 401; 116/215

[56] References Cited

U.S. PATENT DOCUMENTS

| 1,052,050 | 2/1913 | Gray | 33/401 |
|---|---|---|---|
| 1,476,076 | 12/1923 | Hespe | 33/401 |
| 2,292,241 | 8/1942 | Reeves | 172/430 X |
| 2,342,518 | 2/1944 | O'Connor | 33/401 |
| 2,548,226 | 4/1951 | Maier | 33/264 |
| 2,555,954 | 6/1951 | Bruflat | 33/264 |
| 2,565,615 | 8/1951 | McCoy | 33/401 X |
| 2,580,954 | 1/1952 | Przybylski | 33/264 |
| 2,925,656 | 2/1960 | Genovese | 33/401 X |
| 3,845,570 | 11/1974 | Green | 33/401 |
| 4,280,281 | 7/1981 | Gerber | 33/264 |

FOREIGN PATENT DOCUMENTS 118997 2/1927 Switzerland .......................... 33/401

Primary Examiner—Richard T. Stouffer
Attorney, Agent, or Firm—Zarley, McKee, Thomte, Voorhees & Sease

[57] ABSTRACT

A tractor guidance apparatus includes a laterally adjustable sight equipped with a reverse pendulum whereby an upright pivotal sight needle is moved in the same transverse direction as the depending pendulum in response to pivotal movement of the pendulum.

7 Claims, 3 Drawing Figures

CENTERLINE SIGHT WITH REVERSE PENDULUM

BACKGROUND OF THE INVENTION

The present invention is directed generally to a row follower guidance apparatus for a tractor and more specifically to a laterally adjustable centerline sight including a reverse pendulum.

In the past, a tractor operator generally used the center crease in the hood of the tractor as the sight for maintaining the tractor in its properly centered position relative to crop rows. It has been found, however, that there is a significant variation in the positioning of a tractor by different operators because some people are right-eye-dominated and others are left-eye-dominated. The dominant eye is that used for establishing a single line of sight. Most operators align the tractor hood crease or ornament with the guide furrow for centering the tractor but the lines of sight of a left-eye-dominated operator and a right-eye-dominated operator will result in substantially different positions of the tractor relative to the guide furrow.

To resolve this problem, the present inventor developed the furrow follower vision correction system described in U.S. Pat. No. 4,401,166. That system includes a laterally adjustable tractor sighting device which can be adjusted by various operators to accomodate their particular positioning on the tractor seat and dominant eye. Thus by simple lateral adjustment of the sighting device, all operators can easily maintain a uniform and centered position of the tractor relative to planted rows of crops or any other visible centerline.

Whereas the device of U.S. Pat. No. 4,401,166 is believed to be a significant advance in the art, a problem is encountered with the use of this device on hilly terrain. Even on hills, the sighting device is affected only slightly, if at all, by the tractor driving directly up or down a sloping surface. The problem occurs when the tractor drives transversely across the side of a hill whereupon the wheels on one side of the tractor are elevated above the wheels on the opposite side of the tractor. This canting of the tractor toward the downhill direction causes the operator's line of sight through the laterally adjusted sighting device to be offset from the centerline being followed by the tractor. This problem is believed to be resolved by the centerline sight of the present invention which is equipped with a reverse pendulum.

Maier U.S. Pat. No. 2,538,112 shows a sighting device with a straight pendulum without the reverse gearing of the present invention. Such a device is believed to exaggerate the problem rather than solve it since the sight is laterally moved in the wrong direction in response to lateral tilting of the tractor.

Accordingly, a primary object of the present invention is to provide an improved centerline sight for a tractor.

Another object is to provide a centerline sight for a tractor which is laterally adjustable to compensate for the various driving positions and dominant eyes of various operators.

Another object is to provide such a laterally adjustable centerline sight which is equipped with a reverse pendulum so that a proper line of sight is maintained when the tractor is laterally tilted.

Another specific object is to provide a centerline sight wherein the sighting needle is offset in the same direction as the pendulum weight in response to lateral tilting of the tractor.

Finally, another object is to provide a laterally adjustable centerline sight with reverse pendulum which is simple and rugged in construction, inexpensive to manufacture and efficient in operation.

SUMMARY OF THE INVENTION

The centerline sight of the present invention includes a sighting device, a mounting structure for tranversely adjustably supporting the sighting device on the tractor forwardly of the operator's seat and a lock mechanism for securing the sighting device in a selected transverse position along the mounting structure. The laterally adjustable sighting device includes a base, an upstanding pivotally mounted sight and a depending pivotally mounted pendulum which are interconnected by a coating drive connection for movement of the upper end of the sight in the same transverse direction as the lower end of the pendulum in response to pivotal movement of the pendulum. Thus when the pendulum is pivoted counterclockwise about its pivot axis, the upstanding sight is pivoted clockwise about its pivot axis to thereby move in the same transverse direction as the pendulum. An operator who maintains his constant position in the seat and steers the tractor as indicated by the upstanding sight will thus be able to successfully maintain the tractor in its position between crop rows or centered above a ground furrow or other centerline.

DESCRIPTION OF THE PREFERRED EMBODIMENT

Figure 1:
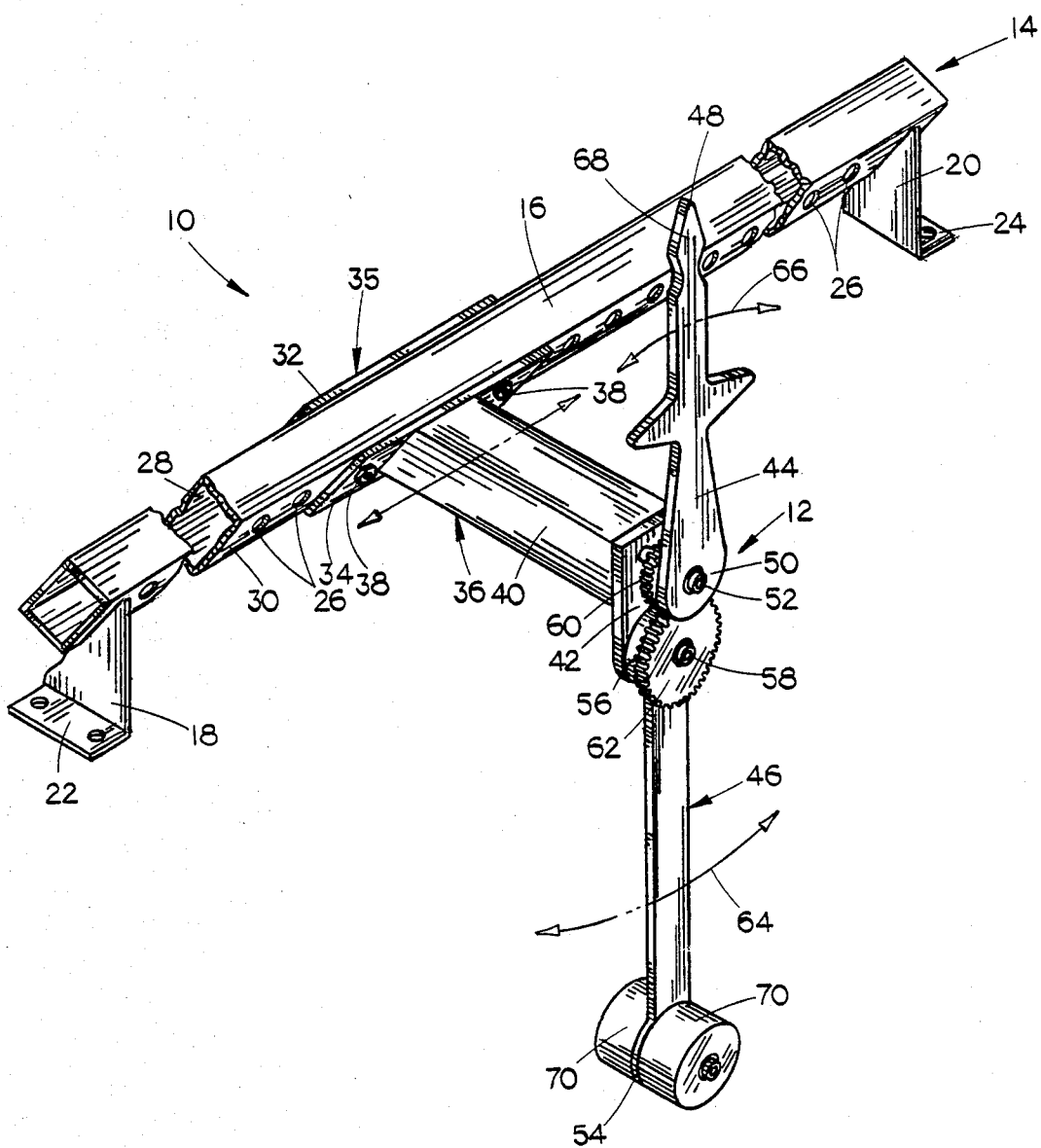
FIG. 1 is a perspective view of the tractor guidance apparatus of the invention.

The tractor guidance apparatus 10 of the present invention is shown in FIG. 1 as including a sighting device 12 which is transversely adjustably supported on a mounting apparatus 14.

The mounting apparatus 14, in the preferred embodiment, includes an elongated support track 16 formed of a rectangle section tubing material. A pair of depending support brackets 18 and 20 are provided at opposite ends of support track 16. The brackets are equipped with outwardly directed flanges 22 and 24 for securement to a support surface adjacent the front end of a tractor. The brackets are arranged to support the tubular track with one edge facing upwardly in a somewhat diamond shape as indicated in the side view of FIG. 3. The tubular track 16 is provided with a plurality of spaced-apart registered holes 26 in opposite sides 28 and 30 thereof. These holes cooperate with similar holes in the opposite legs 32 and 34 of generally U-shaped trolley of a sight support bracket 36. Upon registration of the holes in the trolley 35 with holes 26 in the track 16, a pair of bolts 38 or other fasteners are inserted through the registered holes to maintain the sight support bracket in the selected transverse position along the support track 16. Bracket 36 additionally includes a forwardly extended sight support arm 40 to which the sighting device 12 is secured.

The sighting device 12 includes an upright base plate 42, an upstanding sight needle 44 and a depending pendulum 46. Sight needle 44 has a tapered upper end 48 and a lower end 50 which is pivotally connected to the base plate 42 by a pivot pin 52 directed longitudinally of the tractor. Likewise, pendulum 46 has a lower end 54 and an upper end 56 which is pivotally connected to base plate 42 by a pivot pin 58, also directed longitudinally of the tractor.

Sight needle 44 and pendulum 46 are interconnected by coacting gears 60 and 62. Sight gear 60 is secured to needle 44 for pivotal movement in unison about pivot pin 52. Likewise, pendulum gear 62 is fixed to pendulum 46 for pivotal movement in unison about pivot pin 58. The spacing between pivot pins 52 and 58 is such that gears 60 and 62 are arranged in meshed relation. Accordingly, transverse pivotal movement of pendulum 46, as indicated by arrow 64, produces a pivotal movement of needle 44 as indicated by arrow 66.

Whereas the shape of sight needle 44 is not critical to the present invention, an upwardly tapering design with lateral cut-outs to define a head portion 68 is preferred. Pendulum 46 may be provided with detachable weights 70 adjacent its lower end 54 to assure a smooth positive movement of the pendulum in response to tilting movements of the tractor.

Figure 2:
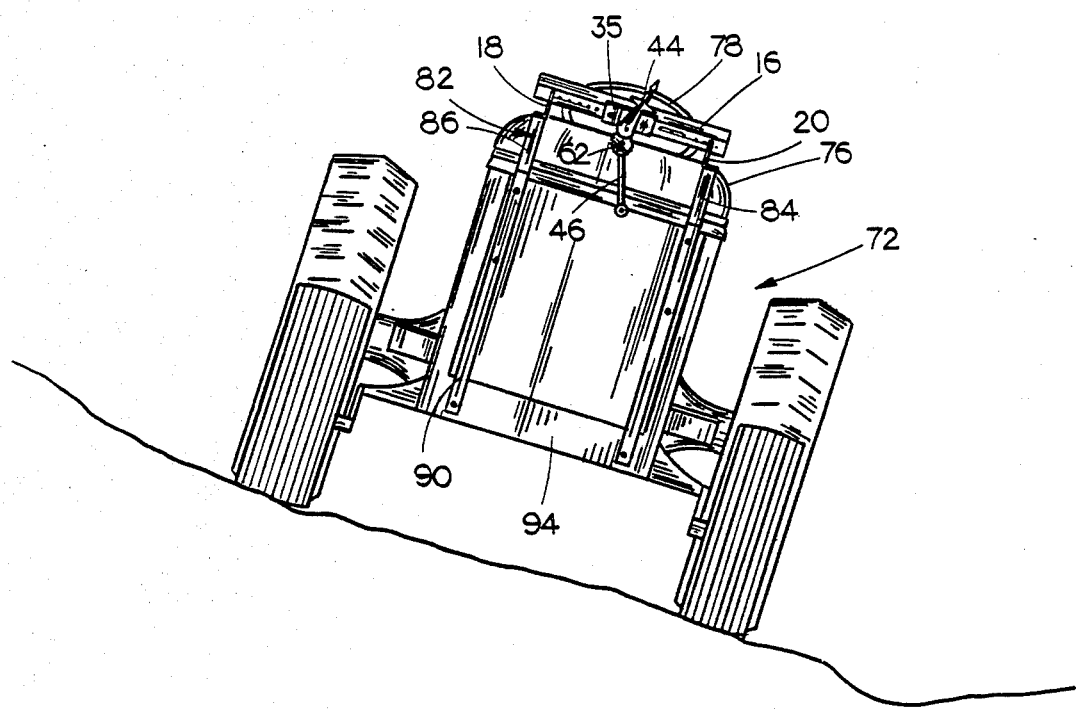
FIG. 2 is a front elevational view of the tractor guidance apparatus installed on a tractor.
Figure 3:
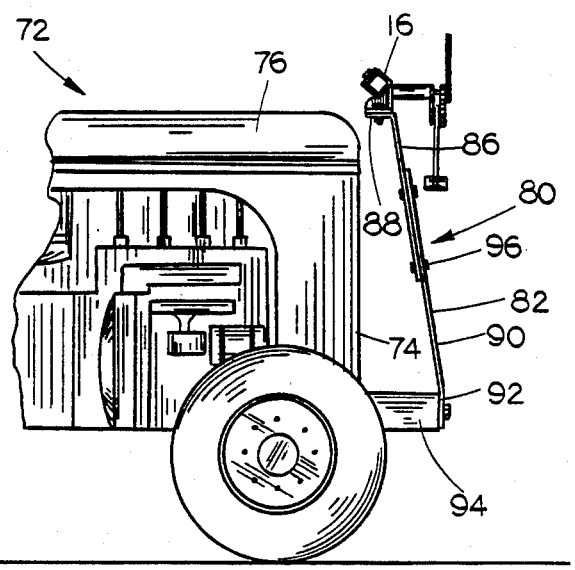
FIG. 3 is a partial side elevational view of the tractor guidance apparatus installed on a tractor.

FIGS. 2 and 3 illustrate the guidance apparatus 10 as installed on an agricultural tractor 72 having a front end 74, an opposite rear end and a hood 76 situated forwardly of the usual operator's seat adjacent steering wheel 78. Whereas support brackest 18 and 20 are adapted for direct connection to the tractor hood 76, many farmers and other equipment operators are reluctant to drill mounting holes in the hoods of expensive new tractors. To resolve this problem an alternate support frame may be provided. Support frame 80 includes a pair of length-adjustable support arms 82 and 84, each of which comprises an upper arm 86 having a generally horizontally disposed upper flange 88 and a lower arm 90 having a slightly bent lower end portion 92 which is adapted for securement to the forward end of the tractor frame 94 as shown in FIGS. 2 and 3. The upper and lower arms 86 and 90 are overlapped and secured together such as by bolts 96 to achieve a length such that the upper flanges 88 are disposed approximately in the plane of hood 76. Support frame 80 is inclined rearwardly as shown in FIG. 3 for space efficiency.

In operation, once the guidance apparatus 10 is installed on a tractor, it can be adjusted for a particular operator by situating the tractor on level ground and then laterally adjusting the sight as described in U.S. Pat. No. 4,401,166. To do this the operator climbs onto the operator's seat with his head generally positioned relative to the longitudinal centerline of the tractor. His dominant eye is therefore somewhat offset from the centerline. The sighting device 12 is then laterally adjusted to a position so that the upper end of the sight needle 44 intersects a line of sight from the operator's dominant eye to a ground furrow or other centerline over which the tractor is situated. The sight support bracket 36 is then slightly adjusted to register the holes in trolley 35 with the closest holes 26 in track 16, whereupon fasteners 38 are inserted through the registered holes to secure the sighting device in its adjusted tranverse position.

As the tractor proceeds across a field, the operator can easily maintain the tractor in its desired centered position over the ground centerline by maintaining a constant position in the tractor seat and steering the tractor to align the sight needle 44 with the ground centerline. On uneven terrain as indicated in FIG. 2, the tractor is laterally tilted so that the ground wheels on one side are lower than the ground wheels on the other side. The pendulum 46 is thus pivoted in a counterclockwise direction, as seen in FIG. 2, by the normal effect of gravity. Gears 60 and 62 operate to pivot the sight needle 44 in a clockwise direction as seen in FIG. 2 so that both the needle and the pendulum are moved in the same transverse direction relative to the vertical centerline of the tractor. The transverse pivotal movement of sight needle 44 compensates for the effect of the tilting of the tractor. Thus as the operator steers to maintain the pivoted sight needle 44 in alignment with the ground centerline, the tractor remains properly situated between the crop rows even while traversing the side of a hill.

Whereas the preferred embodiment of the invention has been shown and described herein, it will be appreciated that there are many modifications, substitutions and additions which are within the intended broad scope of the appended claims. For example, the relative lengths of the pendulum 46 and sight needle 44 may be selected to accomodate mounting positions of varying height above the ground and distances from the operator's seat.

It has been found advantageous to provide a stepped-up gear ratio between gears 60 and 62 so that the sight needle 44 is pivoted through a greater angle than the pendulum in response to pivotal movement of the pendulum. A preferred gear ratio is $2\frac{1}{2}:1$ although a ratio of 2:1 or lower may be preferred for certain installations.

The means for supporting the reverse pendulum sighting device 12 adjacent the forward end of the tractor is not critical to the present invention although it is important that the mounting apparatus provide for lateral adjustability of the sighting device to accomodate the driving positions and dominant eye of different operators.

Thus there has been shown and described a tractor guidance apparatus which accomplishes at least all of the stated objects.

I claim:

1. A row follower guidance apparatus for a tractor having front and rear ends and a forwardly facing operator seat thereon, said apparatus comprising, a sighting device, mounting means for supporting said sighting device on the tractor forwardly of the operator seat, said mounting means providing for adjustment of said sighting device transversely of the tractor, lock means for securing said sighting device in a selected transverse position along said mounting means, said sighting device including, a base, an upstanding sight having an upper end and a lower end pivotally connected to the base for transverse pivotal movement of the upper end thereof, a pendulum having a lower end and an upper end pivotally connected to the base for transverse pivotal movement of the lower end thereof, and coacting drive means on said sight and pendulum, said coacting drive means being operative to move the upper end of said sight in the same transverse direction as the lower end of said pendulum in response to pivotal movement of said pendulum.

2. The guidance apparatus of claim 1 wherein said coacting drive means comprises a sight gear connected to the lower end of said sight for pivotal movement therewith and a pendulum gear in meshed relation with said sight gear and connected to the upper end of said pendulum for pivotal movement therewith.

3. The guidance apparatus of claim 2 wherein the gear ratio of said coacting drive means is such that said sight is pivoted through a greater angle than said pendulum in response to pivotal movement of said pendulum.

4. The guidance apparatus of claim 2 wherein said pendulum includes an elongated arm having upper and lower ends and a weight connected to the lower end of said arm.

5. The guidance apparatus of claim 1 wherein said pendulum is longer than said sight.

6. The guidance apparatus of claim 1 wherein said mounting means comprises an elongated support track, means for mounting said support track on a tractor, and a sight support bracket positioned on said support track for transverse movement therealong, said sighting device being mounted on said sight support bracket.

7. The guidance apparatus of claim 1 wherein the pivot axis of said sight is situated above the pivot axis for said pendulum.

* * * * *